US012658985B2

(12) United States Patent
Perotti et al.

(10) Patent No.: US 12,658,985 B2
(45) Date of Patent: Jun. 16, 2026

(54) MAPPING MULTIPLE-INPUT MULTIPLE-OUTPUT LAYERS, MODULATION AND CODING SCHEME SELECTION AND CONTROL SIGNALING THEREOF

(71) Applicant: HUAWEI TECHNOLOGIES CO., LTD., Shenzhen (CN)

(72) Inventors: Alberto Giuseppe Perotti, Segrate (IT); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/886,525

(22) Filed: Sep. 16, 2024

(65) Prior Publication Data

US 2025/0015843 A1     Jan. 9, 2025

Related U.S. Application Data

(63) Continuation of application No. PCT/EP2022/056933, filed on Mar. 17, 2022.

(51) Int. Cl.
*H04B 7/0413* (2017.01)
*H04L 1/00* (2006.01)

(52) U.S. Cl.
CPC ......... *H04B 7/0413* (2013.01); *H04L 1/0003* (2013.01); *H04L 1/0025* (2013.01)

(58) Field of Classification Search
CPC ............................ H04B 7/0413; H04L 1/0003
See application file for complete search history.

(56) References Cited

U.S. PATENT DOCUMENTS

2011/0103498 A1*    5/2011    Chen .................... H04B 7/0404
                                                                    375/260

FOREIGN PATENT DOCUMENTS

WO          2022083876 A1       4/2022

OTHER PUBLICATIONS

Qualcomm Inc., "CW to layer mapping and frequency domain interleaving," 3GPP TSG RAN WG1 #88bis, R1-1705574, 3rd Generation Partnership Project (3GPP), Mobile Competence Centre; 650, Route Des Lucioles; F-06921 Sophia-Antipolis Cedex ; France, XP051243702, Total 16 pages (April 3-7, 2017).

(Continued)

*Primary Examiner* — Rahel Guarino
(74) *Attorney, Agent, or Firm* — Leydig, Voit & Mayer, Ltd.

(57) ABSTRACT

Embodiments of the invention relate to a first communication device that maps a set of MIMO layers $(M_1, \ldots, M_L)$ into two or more subsets of MIMO layers $(S_1, \ldots, S_G)$ based on a modulation for each MIMO layer $(M_l)$ and selects a modulation and coding scheme (MCS) for the set of MIMO layers $(M_1, \ldots, M_L)$ based on a code rate $R_C$ for a code word C and/or a modulation for a subset of MIMO layers $(S_g)$. Further, the first communication device transmits the code word C on the set of MIMO layers $(M_1, \ldots, M_L)$ to a second communication device based on the selected MCS and transmits control information indicating the selected MCS and a result of the mapping of the set of MIMO layers $(M_1, \ldots, M_L)$ to the second communication device. The first communication device can thereby provide better protection of the systematic bits of the code word.

20 Claims, 8 Drawing Sheets

(56)             References Cited

OTHER PUBLICATIONS

"3rd Generation Partnership Project; Technical Specification Group Radio Access Network; NR; Physical channels and modulation (Release 16)," 3GPP TS 38.211 V16.7.0, Total 134 pages (Sep. 2021).

Li et al., "Bit-Reliability Mapping in LDPC-Coded Modulation Systems," IEEE Communications Letters, vol. 9, No. 1, Total 3 pages (Jan. 2005).

"3rd Generation Partnership Project; Technical Specification Group Radio Access Network;NR;Multiplexing and channel coding (Release 16)," 3GPP TS 38.212 V16.7.0, Total 153 pages (Sep. 2021).

"3rd Generation Partnership Project; Technical Specification Group Radio Access Network; NR; Physical layer procedures for data (Release 16)," 3GPP TS 38.214 V16.7.0, Total 171 pages (Sep. 2021).

Qualcomm Incorporated, "Codeword to Layer Mapping," 3GPP TSG-RAN WG1 NR Ad-Hoc, R1-1700795, Total 10 pages (Jan. 16-20, 2017).

* cited by examiner

Figures 1, 2:
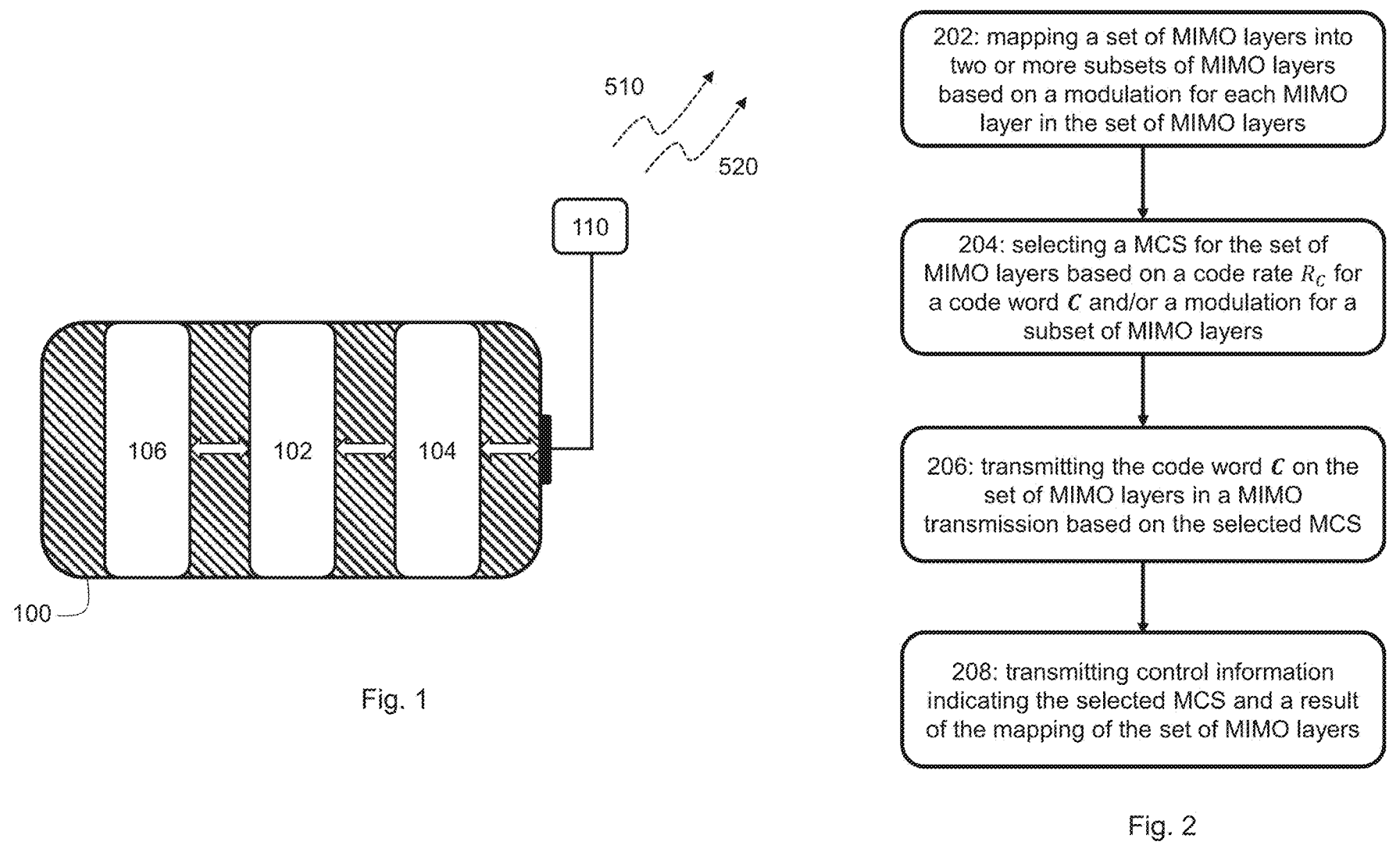

202: mapping a set of MIMO layers into two or more subsets of MIMO layers based on a modulation for each MIMO layer in the set of MIMO layers 204: selecting a MCS for the set of MIMO layers based on a code rate $R_c$ for a code word $C$ and/or a modulation for a subset of MIMO layers 206: transmitting the code word $C$ on the set of MIMO layers in a MIMO transmission based on the selected MCS 208: transmitting control information indicating the selected MCS and a result of the mapping of the set of MIMO layers

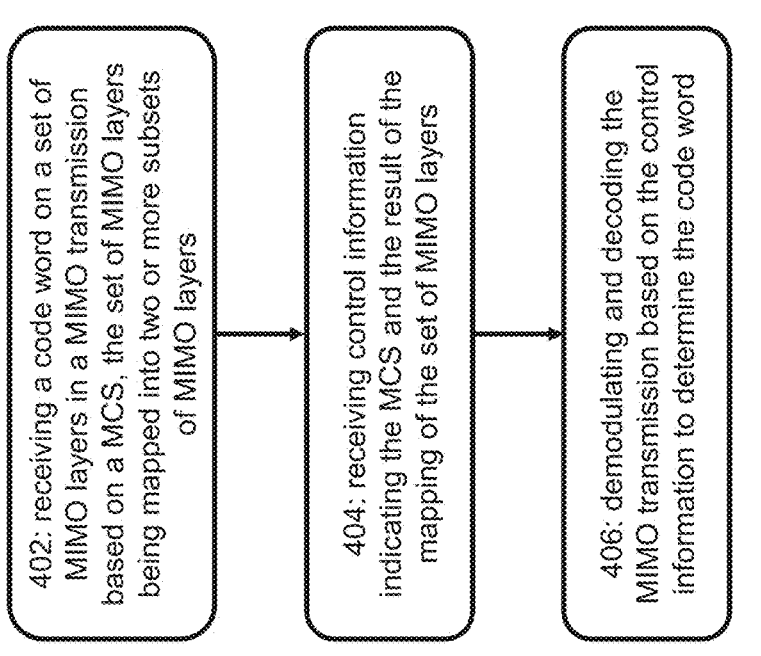

402: receiving a code word on a set of MIMO layers in a MIMO transmission based on a MCS, the set of MIMO layers being mapped into two or more subsets of MIMO layers 404: receiving control information indicating the MCS and the result of the mapping of the set of MIMO layers 406: demodulating and decoding the MIMO transmission based on the control information to determine the code word

Fig. 4

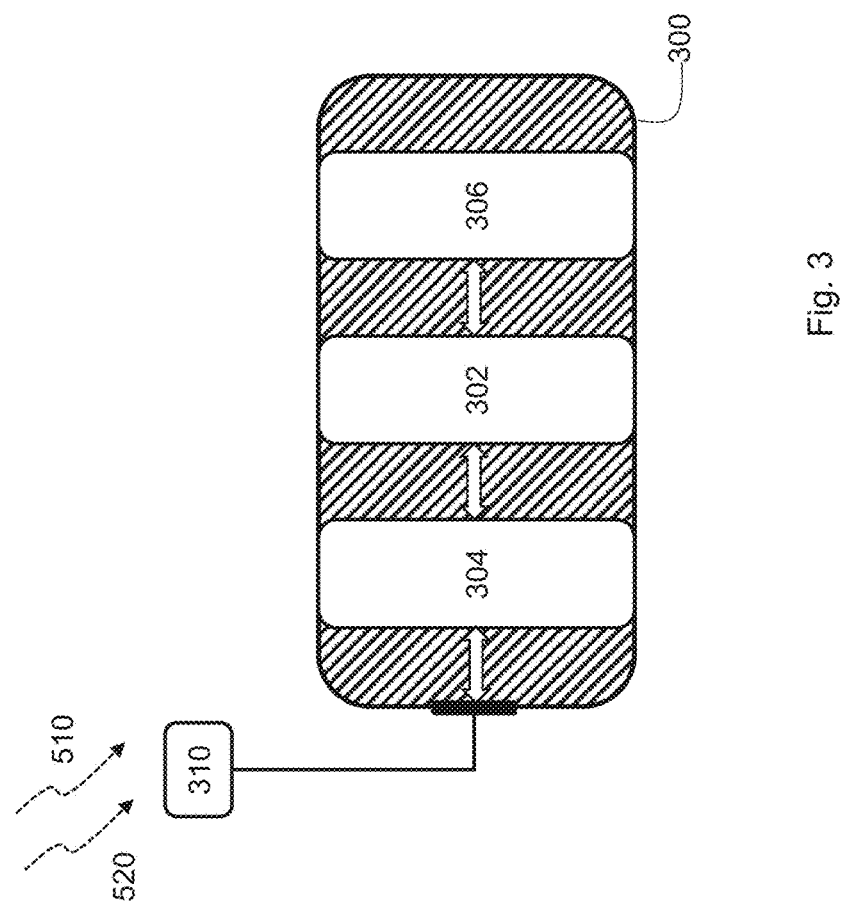

MAPPING MULTIPLE-INPUT MULTIPLE-OUTPUT LAYERS, MODULATION AND CODING SCHEME SELECTION AND CONTROL SIGNALING THEREOF

CROSS-REFERENCE TO RELATED APPLICATIONS

This application is a continuation of International Application No. PCT/EP2022/056933, filed on Mar. 17, 2022, the disclosure of which is hereby incorporated by reference in its entirety.

TECHNICAL FIELD

The disclosure relates to mapping multiple-input multiple-output (MIMO) layers in a MIMO transmission, modulation and coding scheme selection and control signaling thereof. Furthermore, the disclosure also relates to corresponding methods and a computer program.

BACKGROUND

The fifth generation of mobile wireless communication networks such as the $3^{rd}$ Generation Partnership Project (3GPP) New Radio (NR) use Multiple-Input Multiple-Output (MIMO) methods in order to achieve high data rates for transmission between the network base station (BS) or 3GPP gNodeB (gNB) and user equipment (UE) terminals. MIMO methods exploit the radio channel multipath propagation through usage of multiple transmitter and receiver antennas so as to create a number of independent spatial layers whereon information can be transmitted concurrently. The propagation phenomena that occur on the radio channel often cause large imbalances among the Signal-to-Noise Ratios (SNRs) of the MIMO layers. Therefore, the information that is transmitted on high-SNR MIMO layers enjoys better average protection compared to the information that is transmitted on low-SNR MIMO layers.

In NR, any data stream exchanged between the network and a given UE consists of a sequence of data blocks, where each data block is independently encoded using Low-Density Parity Check (LDPC) codes for error correction so as to obtain a LDPC code word. The LDPC code word is interleaved, modulated and mapped to a number v of MIMO layers. Any NR LDPC code word consists of a first initial part containing all information bits or a subset thereof, followed by a second part containing parity bits for error correction.

SUMMARY

The present disclosure provides a solution which mitigates or solves the drawbacks and problems of conventional solutions.

The present disclosure further provides a solution for improved MIMO transmissions in a communication system.

According to a first aspect, a first communication device for a communication system is provided, the first communication device being configured to:

map a set of multiple-input-multiple-output, MIMO, layers into two or more subsets of MIMO layers based on a modulation for each MIMO layer in the set of MIMO layers, wherein MIMO layers in a same subset of MIMO layers have a same modulation;

select a modulation and coding scheme, MCS, for the set of MIMO layers based on a code rate $R_C$ for a code word C and/or a modulation for a subset of MIMO layers among the two or more subsets of MIMO layers;

transmit the code word C on the set of MIMO layers in a MIMO transmission to a second communication device based on the selected MCS; and transmit control information to the second communication device, the control information indicating the selected MCS and a result of the mapping of the set of MIMO layers into the two or more subsets of MIMO layers.

A MIMO layer may be understood as a channel resource whereon a given transmitter can send information without causing interference to other information transmissions through the same antenna system in the same time and in the same frequency.

A modulation for a MIMO layer may be understood as any digital modulation techniques or schemes, such as conventional binary phase shift keying (BPSK) modulation, quadrature phase shift keying (QPSK) modulation, M signals Phase Shift Keying (M-PSK), M signals Quadrature Amplitude Modulation (M-QAM), etc. Associated with each modulation technique or scheme there is a set of M (distinct and unique) signals, where M is typically a power of 2, that is $M=2^{Q_m}$, where $Q_m$ is a positive integer called modulation order.

An advantage of the first communication device according to the first aspect is that the transmitter of the first communication device may control the mapping of the systematic and parity bits of the code word to the set of MIMO layers, thereby being able to provide better protection of the systematic bits of the code word.

In an implementation form of a first communication device according to the first aspect, the first communication device is configured to determine a modulation for each MIMO layer in the set of MIMO layers based on a channel quality for the MIMO layer and a channel quality threshold value.

An advantage with this implementation form is that the modulation in each MIMO layer is determined based on the quality of that MIMO layer, thereby providing a high capacity by using high modulation order in the high-quality MIMO layer(s) and, at the same time, a high robustness by using a low modulation order in the low-quality MIMO layer(s).

In an implementation form of a first communication device according to the first aspect, the determined modulation for the MIMO layer comprises a set of channel qualities all exceeding the channel quality threshold value.

An advantage with this implementation form is that, in any given MIMO layer, the modulations with least significant bits quality below a given threshold are not used as those bits would not carry any significant amount of information.

In an implementation form of a first communication device according to the first aspect, the first communication device is configured to determine the code rate $R_C$ for the code word C based on a code word length E and an information message length K for the set of MIMO layers, wherein the information message length K is determined based on a set of channel qualities for the set of MIMO layers.

An advantage with this implementation form is that the information message length does not exceed the largest length of any message that can be reliably transmitted.

In an implementation form of a first communication device according to the first aspect, the determined code rate $R_C$ is the highest code rate for the code word C.

An advantage with this implementation form is that, by selecting an MCS with code rate not exceeding the highest code rate, transmission at a higher data rate than the highest supported rate by the channel is avoided.

In an implementation form of a first communication device according to the first aspect, the result of the mapping of the set of MIMO layers into the two or more subsets of MIMO layers is indicated by:

a sequence of values, where a l-th value in the sequence of values indicates that a l-th MIMO layer is in a $(g_l)$-th subset of MIMO layers, where l is an integer; or a sequence of bits, where a l-th bit in the sequence of bits indicates that a l-th MIMO layer is in a first subset of MIMO layers or in a second subset of MIMO layers, where l is an integer; or a sequence of bits, where a k-th bit in the sequence of bits indicates that a k-th MIMO layer and a (k+1)-th MIMO layer are in the same subset of MIMO layers, where k is an integer.

An advantage with this implementation form is that the subsets of MIMO layers are indicated to the second communication device using a small number of bits, thereby reducing the control information overhead in the system.

In an implementation form of a first communication device according to the first aspect, the first communication device is configured to select the MCS from a set of predefined MCSs.

An advantage with this implementation form is that the first communication device can indicate to the second communication device a selected MCS by using a small number of bits, thereby reducing the control information overhead in the system.

In an implementation form of a first communication device according to the first aspect, the selected MCS in the set of predefined MCSs has a code rate being closest to the code rate $R_C$ for the code word C but not exceeding the code rate $R_C$ for the code word C.

An advantage with this implementation form is that the code rate indicated by the selected MCS produces the largest transmission data rate not exceeding the maximum data rate supported by the channel. Hence, higher throughput in the system is possible.

In an implementation form of a first communication device according to the first aspect, the control information further indicates a modulation of each subset of MIMO layers among the two or more subsets of MIMO layers.

An advantage with this implementation form is that the first communication device can select a different modulation in each MIMO layer so as to adapt the modulation order to the layer quality and then indicate the selected modulations to the second communication device by sending the above control information.

In an implementation form of a first communication device according to the first aspect, the control information further indicates a subset of MIMO layers among the two or more subsets of MIMO layers.

An advantage with this implementation form is that the modulation indicated in the MCS is the modulation used in the indicated subset of MIMO layers, thereby further reducing the number of control bits used for indication of modulations.

In an implementation form of a first communication device according to the first aspect, the control information further indicates a modulation for a subset of MIMO layers having the highest or the lowest channel quality among the two or more subset of MIMO layers.

An advantage with this implementation form is that only one modulation is indicated in the control information, and the modulations for other subsets of MIMO layers are derived from the indicated modulation.

In an implementation form of a first communication device according to the first aspect, the selected MCS has a modulation equal to a modulation of a subset of MIMO layers having a highest modulation order or a lowest modulation order.

An advantage with this implementation form is that there is no need to indicate another modulation order in addition to the modulation which is already indicated in the MCS. The MCS-indicated modulation is conventionally used in a given subset of MIMO layers, either the subset of MIMO layers with highest SNR or the subset of MIMO layers with lowest SNR, and the modulations for the other subsets of MIMO layers are derived from the indicated modulation e.g., according to a predefined rule.

In an implementation form of a first communication device according to the first aspect, the control information further indicates a code rate scaling factor for the selected MCS from the set of predefined MCSs.

An advantage with this implementation form is that it conveniently extends the joint indication of code rate and modulation of conventional MCS by a larger set of code-rate and modulation pairs thereby making the multilayer interleaver-based MIMO transmission more effective.

In an implementation form of a first communication device according to the first aspect, the code word C is a low-density parity check code word.

According to a second, second communication device for a communication system is provided, the second communication device being configured to:

receive a code word C on a set of multiple-input-multiple-output, MIMO, layers in a MIMO transmission from a first communication device based on a modulation and coding scheme, MCS, the set of MIMO layers being mapped into two or more subsets of MIMO layers based on a modulation for each MIMO layer in the set of MIMO layers, wherein MIMO layers in a same subset of MIMO layers have the same modulation;

receive control information from the first communication device, the control information indicating the MCS and the result of the mapping of the set of MIMO layers into the two or more subsets of MIMO layers; and demodulate and decode the MIMO transmission based on the control information to determine the code word C.

An advantage of the second communication device according to the second aspect is that the transmitter of the first communication device may control the mapping of the systematic and parity bits of the code word to the set of MIMO layers, thereby being able to provide better protection of the systematic bits of the code word transmitted to the second communication device.

In an implementation form of a second communication device according to the second aspect, demodulating and decoding the MIMO transmission comprises determining a modulation for each MIMO layer in the set of MIMO layers, a code word length E, and an information message length K for the code word C based on the control information.

An advantage with this implementation form is that determining the modulation of each MIMO layer, the code word length and the information message length is facilitated in the second communication device by the received control information.

In an implementation form of a second communication device according to the second aspect, the control information indicates a result of the mapping of the set of MIMO layers into the two or more subsets of MIMO layers by:

a sequence of values, where a l-th value in the sequence of values indicates that a l-th MIMO layer is in a $(g_l)$-th subset of MIMO layers, where l is an integer; or a sequence of bits, where a l-th bit in the sequence of bits indicates that a l-th MIMO layer is in a first subset of MIMO layers or in a second subset of MIMO layers, where l is an integer; or a sequence of bits, where a k-th bit in the sequence of bits indicates that a k-th MIMO layer and a (k+1)-th MIMO layer are in the same subset of MIMO layers, where k is an integer.

An advantage with this implementation form is that the subsets of MIMO layers are indicated to the second communication device using a small number of bits, thereby reducing the control information overhead in the system.

In an implementation form of a second communication device according to the second aspect, the control information further indicates a modulation of each subset of MIMO layers among the two or more subsets of MIMO layers.

An advantage with this implementation form is that the first communication device can select a different modulation in each MIMO layer so as to adapt the modulation order to the layer quality and then indicate the selected modulations to the second communication device by sending the above control information.

In an implementation form of a second communication device according to the second aspect, the control information further indicates a subset of MIMO layers among the two or more subsets of MIMO layers.

An advantage with this implementation form is that the modulation indicated in the MCS is the modulation used in the indicated subset of MIMO layers, thereby further reducing the number of control bits used for indication of modulations.

In an implementation form of a second communication device according to the second aspect, the control information further indicates a modulation for a subset of MIMO layers having the highest or the lowest channel quality among the two or more subset of MIMO layers.

An advantage with this implementation form is that only one modulation is indicated in the control information, and the modulations for other subsets of MIMO layers are derived from the indicated modulation.

In an implementation form of a second communication device according to the second aspect, the indicated MCS has a modulation equal to a modulation of a subset of MIMO layers having a highest modulation order or a lowest modulation order.

An advantage with this implementation form is that there is no need to indicate another modulation order in addition to the modulation which is already indicated in the MCS. The MCS-indicated modulation is conventionally used in a given subset of MIMO layers, either the subset of MIMO layers with highest SNR or the subset of MIMO layers with lowest SNR, and the modulations for the other subsets of MIMO layers are derived from the indicated modulation e.g., according to a predefined rule.

In an implementation form of a second communication device according to the second aspect, the control information further indicates a code rate scaling factor for the indicated MCS.

An advantage with this implementation form is that it conveniently extends the joint indication of code rate and modulation of conventional MCS by a larger set of code-rate and modulation pairs thereby making the multilayer interleaver-based MIMO transmission more effective.

In an implementation form of a second communication device according to the second aspect, the code word C is a low-density parity check code word.

According to a third aspect, a method for a first communication device is provided, the method comprising:

mapping a set of multiple-input-multiple-output, MIMO, layers into two or more subsets of MIMO layers based on a modulation for each MIMO layer in the set of MIMO layers, wherein MIMO layers in a same subset of MIMO layers have a same modulation;

selecting a modulation and coding scheme, MCS, for the set of MIMO layers based on a code rate $R_C$ for a code word C and/or a modulation for a subset of MIMO layers among the two or more subsets of MIMO layers;

transmitting the code word C on the set of MIMO layers in a MIMO transmission to a second communication device based on the selected MCS; and transmitting control information to the second communication device, the control information indicating the selected MCS and a result of the mapping of the set of MIMO layers into the two or more subsets of MIMO layers.

The method according to the third aspect can be extended into implementation forms corresponding to the implementation forms of the first communication device according to the first aspect. Hence, an implementation form of the method comprises the feature(s) of the corresponding implementation form of the first communication device.

The advantages of the methods according to the third aspect are the same as those for the corresponding implementation forms of the first communication device according to the first aspect.

According to a fourth aspect, a method for a second communication device is provided, the method comprising:

receiving a code word C on a set of multiple-input-multiple-output, MIMO, layers in a MIMO transmission from a first communication device based on a modulation and coding scheme, MCS, the set of MIMO layers being mapped into two or more subsets of MIMO layers based on a modulation for each MIMO layer in the set of MIMO layers, wherein MIMO layers in a same subset of MIMO layers have the same modulation;

receiving control information from the first communication device, the control information indicating the MCS and the result of the mapping of the set of MIMO layers into the two or more subsets of MIMO layers; and demodulating and decoding the MIMO transmission based on the control information to determine the code word C.

The method according to the fourth aspect can be extended into implementation forms corresponding to the implementation forms of the second communication device according to the second aspect. Hence, an implementation form of the method comprises the feature(s) of the corresponding implementation form of the second communication device.

The advantages of the methods according to the fourth aspect are the same as those for the corresponding implementation forms of the second communication device according to the second aspect.

Embodiments also relate to a computer program, characterized in program code, which when run by at least one processor causes the at least one processor to execute any method according to embodiments. Further, embodiments also relate to a computer program product comprising a computer readable medium and the mentioned computer program, wherein the computer program is included in the computer readable medium, and may comprises one or more from the group of: read-only memory (ROM), programmable ROM (PROM), erasable PROM (EPROM), flash memory, electrically erasable PROM (EEPROM), hard disk drive, etc.

Further applications and advantages of embodiments will be apparent from the following detailed description.

BRIEF DESCRIPTION OF THE DRAWINGS

The appended drawings are intended to clarify and explain different embodiments, in which:

FIG. 1 shows a first communication device according to an embodiment;

FIG. 2 shows a flow chart of a method for a first communication device according to an embodiment;

FIG. 3 shows a second communication device according to an embodiment;

FIG. 4 shows a flow chart of a method for a second communication device according to an embodiment;

DETAILED DESCRIPTION

Figure 5:
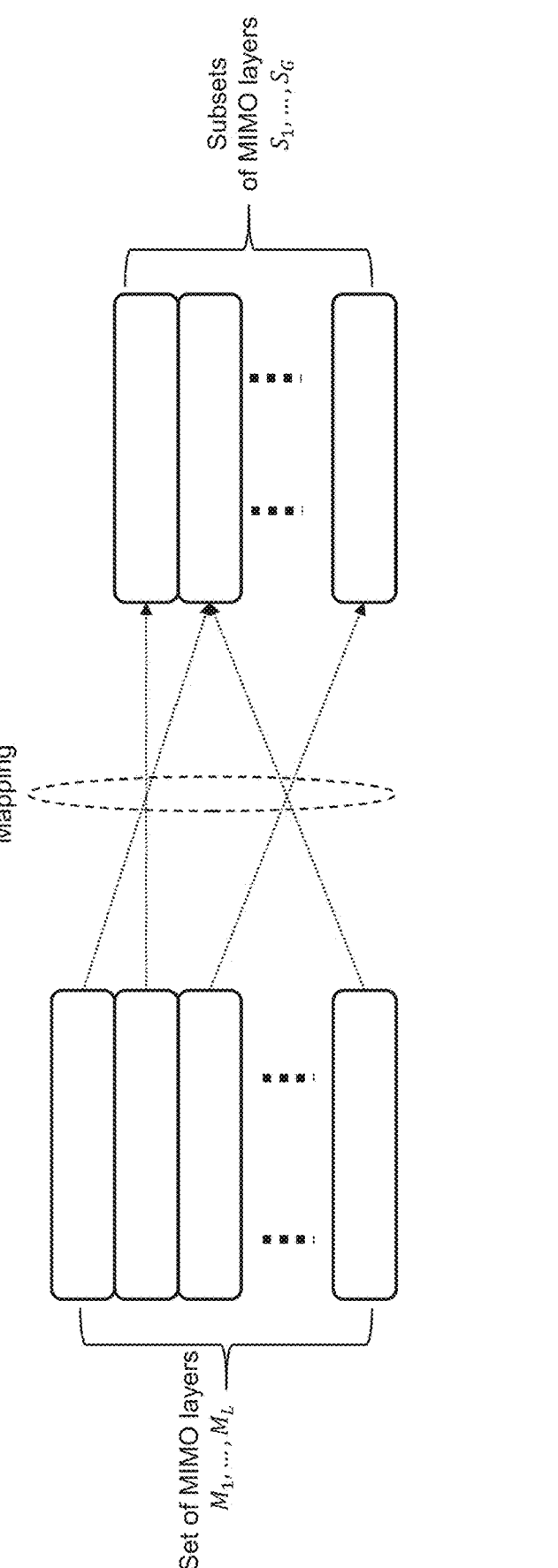
FIG. 5 illustrates mapping of a set of MIMO layers into subsets of MIMO layers.

In NR, the LDPC encoder maps data block $i=(i_1, \ldots, i_K)$ to a codeword $c=(c_1, \ldots, c_N)$ which is written to a circular buffer. In an initial transmission, a rate matching block reads a codeword segment $f=(f_1, \ldots, f_E)$, $K<E<N$, from the buffer and sends it to the interleaver. The codeword segment f consists of two parts: a first part (conventionally called systematic) containing all or part of the information bits $(i_1, \ldots, i_K)$, and a second part containing parity bits. In NR, the systematic part contains the information bits $(i_{2Z+}, \ldots, i_K)$, where Z is the lifting size.

It is known that LDPC decoding performance can be improved by providing better protection to systematic bits compared to parity check bits.

A conventional LDPC code word multilayer interleaver maps the systematic bits to high SNR layers thereby providing better protection to systematic bits. The conventional multilayer interleaver relies on the conventional MCS mechanism of NR in order to signal the modulation and code rate for a given code word. Since the conventional Modulation and Coding Scheme (MCS) signaling mechanism of NR indicates a single modulation for all layers, the conventional multilayer interleaver uses the same modulation in all MIMO layers. However, the transmitter should use a high modulation order in the high-SNR layer(s) in order to fully harvest the capacity and, at the same time, a low modulation order in the low-SNR layer(s) in order to obtain better robustness to noise and interference. Moreover, conventional NR MCSs combine low code rates with low order modulations and high code rates with high order modulations. NR MCSs hence cause performance degradation of the multilayer interleaver based transmission as typically better performance is obtained with high order modulations and mid-low code rates—a combination which is not available in NR MCSs.

It is therefore herein disclosed a solution for mapping MIMO layers into subsets of MIMO layers, select a MCS for a MIMO transmission and control signaling thereof. The disclosed solution may in embodiments be implemented in a first communication device 100, also denoted a transmitter device or a transmitter, and a second communication device 300, also denoted a receiver device or a receiver. Corresponding methods are also herein disclosed.

FIG. 1 shows a first communication device 100 according to an embodiment. In the embodiment shown in FIG. 1, the first communication device 100 comprises a processor 102, a transceiver 104 and a memory 106. The processor 102 is coupled to the transceiver 104 and the memory 106 by communication means 108 known in the art. The first communication device 100 may be configured for wireless and/or wired communications in a communication system. The wireless communication capability may be provided with an antenna or antenna array 110 coupled to the transceiver 104, while the wired communication capability may be provided with a wired communication interface 112 e.g., coupled to the transceiver 104.

The processor 102 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, or one or more chipsets. The memory 106 may be a read-only memory, a random access memory (RAM), or a non-volatile RAM (NVRAM). The transceiver 304 may be a transceiver circuit, a power controller, or an interface providing capability to communicate with other communication modules or communication devices, such as network nodes and network servers. The transceiver 104, memory 106 and/or processor 102 may be implemented in separate chipsets or may be implemented in a common chipset. That the first communication device 100 is configured to perform certain actions can in this disclosure be understood to mean that the first communication device 100 comprises suitable means, such as e.g., the processor 102 and the transceiver 104, configured to perform the actions.

According to embodiments and with reference to FIGS. 1 and 5, the first communication device 100 is configured to map a set of MIMO layers $M_1, \ldots, M_L$ into two or more subsets of MIMO layers $S_1, \ldots, S_G$ based on a modulation for each MIMO layer $M_l$ in the set of MIMO layers $M_1, \ldots, M_L$. MIMO layers in a same subset of MIMO layers have a same modulation. The first communication device 100 is configured to select a MCS for the set of MIMO layers $M_1, \ldots, M_L$ based on a code rate $R_C$ for a code word C and/or a modulation for a subset of MIMO layers $S_g$ among the two or more subsets of MIMO layers $S_1, \ldots, S_G$. The first communication device 100 is configured to transmit the code word C on the set of MIMO layers $M_1, \ldots, M_L$ in a MIMO transmission 510 to a second communication device 300 based on the selected MCS. The first communication device 100 is configured to transmit control information 520 to the second communication device 300. The control information 520 indicates the selected MCS and a result of the mapping of the set of MIMO layers $M_1, \ldots, M_L$ into the two or more subsets of MIMO layers $S_1, \ldots, S_G$.

FIG. 2 shows a flow chart of a corresponding method 200 which may be executed in a first communication device 100, such as the one shown in FIG. 1. The method 200 comprises mapping 202 a set of MIMO layers $M_1, \ldots, M_L$ into two or more subsets of MIMO layers $S_1, \ldots, S_G$ based on a modulation for each MIMO layer $M_l$ in the set of MIMO layers $M_1, \ldots, M_L$. MIMO layers in a same subset of MIMO layers have a same modulation. The method 200 comprises selecting 204 a MCS for the set of MIMO layers $M_1, \ldots, M_L$ based on a code rate $R_C$ for a code word C and/or a modulation for a subset of MIMO layers $S_g$ among the two or more subsets of MIMO layers $S_1, \ldots, S_G$. The method 200 comprises transmitting 206 the code word C on the set of MIMO layers $M_1, \ldots, M_L$ in a MIMO transmission 510 to a second communication device 300 based on the selected MCS. The method 200 comprises transmitting 208 control information 520 to the second communication device 300. The control information 520 indicates the selected MCS and a result of the mapping of the set of MIMO layers $M_1, \ldots, M_L$ into the two or more subsets of MIMO layers $S_1, \ldots S_G$.

The mapping of the set of MIMO layers which is illustrated in FIG. 5 may be performed according to the quality of each MIMO layer, such that two MIMO layers are in the same subset of MIMO layers if their qualities are the same or similar.

FIG. 3 shows a second communication device 300 according to an embodiment. In the embodiment shown in FIG. 3, the second communication device 300 comprises a processor 302, a transceiver 304 and a memory 306. The processor 302 is coupled to the transceiver 304 and the memory 306 by communication means 308 known in the art. The second communication device 300 further comprises an antenna or antenna array 310 coupled to the transceiver 304, which means that the second communication device 300 is configured for wireless communications in a communication system.

The processor 302 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset. The memory 306 may be a read-only memory, a random access memory (RAM), or a non-volatile RAM (NVRAM). The transceiver 104 may be a transceiver circuit, a power controller, or an interface providing capability to communicate with other communication modules or communication devices. The transceiver 304, the memory 306 and/or the processor 302 may be implemented in separate chipsets or may be implemented in a common chipset. That the second communication device 300 is configured to perform certain actions can in this disclosure be understood to mean that the second communication device 300 comprises suitable means, such as e.g., the processor 302 and the transceiver 304, configured to perform the actions.

According to embodiments, the second communication device 300 is configured to receive a code word C on a set of MIMO layers $M_1, \ldots, M_L$ in a MIMO transmission 510 from a first communication device 100 based on a MCS, the set of MIMO layers $M_1, \ldots, M_L$ being mapped into two or more subsets of MIMO layers $S_1, \ldots, S_G$ based on a modulation for each MIMO layer $M_l$ in the set of MIMO layers $M_1, \ldots, M_L$. MIMO layers in a same subset of MIMO layers have the same modulation. The second communication device 300 is configured to receive control information 520 from the first communication device 100. The control information 520 indicates the MCS and the result of the mapping of the set of MIMO layers $M_1, \ldots, M_L$ into the two or more subsets of MIMO layers $S_1, \ldots, S_G$. The second communication device 300 is configured to demodulate and decode the MIMO transmission 510 based on the control information 520 to determine the code word C.

FIG. 4 shows a flow chart of a corresponding method 400 which may be executed in a second communication device 300, such as the one shown in FIG. 3. The method 400 comprises receiving 402 a code word C on a set of MIMO layers $M_1, \ldots, M_L$ in a MIMO transmission 510 from a first communication device 100 based on a MCS. The set of MIMO layers $M_1, \ldots, M_L$ being mapped into two or more subsets of MIMO layers $S_1, \ldots, S_G$ based on a modulation for each MIMO layer $M_l$ in the set of MIMO layers $M_1, \ldots, M_L$. MIMO layers in a same subset of MIMO layers have the same modulation. The method 400 comprises receiving 404 a control information 520 from the first communication device 100. The control information 520 indicates the MCS and the result of the mapping of the set of MIMO layers $M_1, \ldots, M_L$ into the two or more subsets of MIMO layers $S_1, \ldots, S_G$. The method 400 comprises demodulating and decoding 406 the MIMO transmission 510 based on the control information 520 to determine the code word C.

In embodiments, the second communication device 300 demodulates and decodes the MIMO transmission 510 received form the first communication device 100 by determining the following: a modulation for each MIMO layer $M_l$ in the set of MIMO layers $M_1, \ldots, M_L$, a code word length E, and an information message length K for the code word C based on the control information 520 received from the first communication device 100. The modulations for each MIMO layer, the code word length and information message length are determined based on the control information 520 that is transmitted by the first communication device 100 and received by the second communication device 300.

Figure 6:
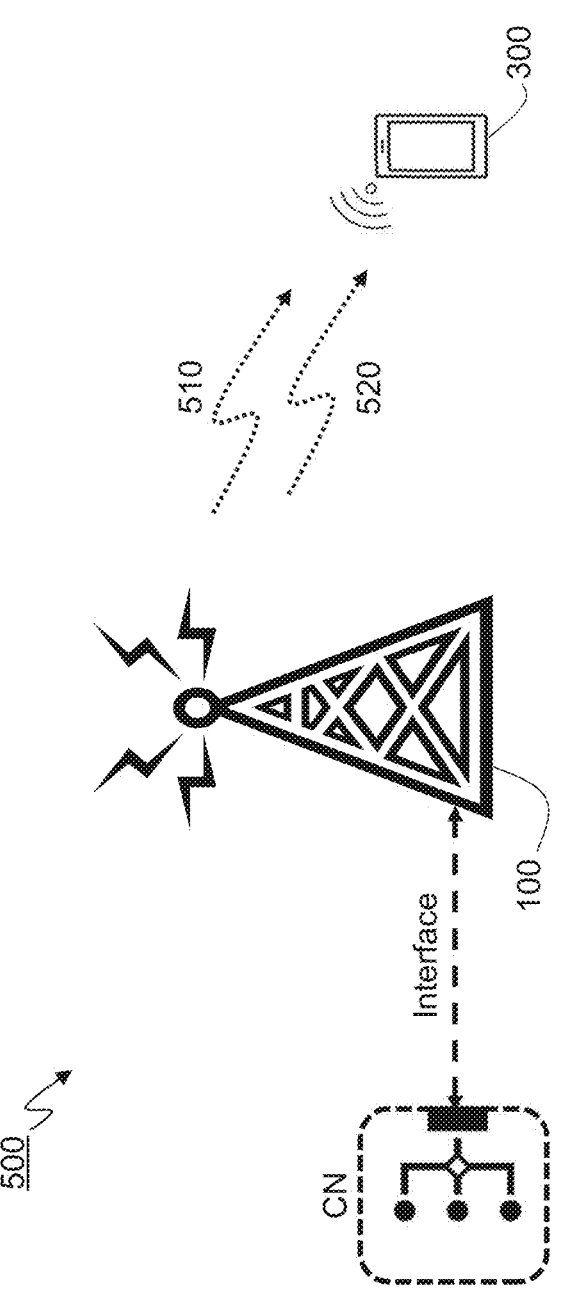
FIG. 6 shows a communication system according to an embodiment.

FIG. 6 shows a communication system 500 according to an embodiment. The communication system 500 in the disclosed example comprises a first communication device 100 and a second communication device 300 configured to communicate and operate in the communication system 500. For simplicity, the shown communication system 500 only comprises one first communication device 100 and one second communication device 300. However, the communication system 500 may comprise any number of first communication devices 100 and any number of second communication devices 300 without deviating from the scope of the present disclosure. The first communication device 100 act as a BS, such as a gNB, while the second communication device act as a UE in the example of FIG. 6. The BS may be part of a Radio Access Network (RAN) that is connected to a network, such as a Core Network (CN) of a 5G system, via a communication interface.

It is further illustrated in FIG. 6 how the first communication device 100 performs a MIMO transmission in the downlink (DL) to the second communication device 300. The MIMO transmission is performed based on a selected MCS which means that the first communication device 100 uses the modulation and the coding of the selected MCS for its MIMO transmission to the second communication device 300. The first communication device 100 also performs control signaling in the DL to the second communication device 300. The DL control signaling, such as downlink control information (DCI) in NR, comprises control information 520 according to embodiments.

For providing deeper understanding of the disclosed solution yet further embodiments will be presented in the following disclosure. These embodiments are set in a 3GPP NR context hence the terminology used. Therefore, the first communication device 100 will in the following be denoted a network access node, such as a gNB, and the second communication device 300 will in the following be denoted a client device, such as a UE, but are not limited thereto. The code word C previously discussed is therefore a LDPC code word to conform with the 3GPP NR standard.

In NR LDPC transmissions, systematic bits need higher protection than parity bits. However, the NR codeword bits interleaver distributes the LDPC code word systematic bits on all MIMO layers regardless of their SNRs. In that way, some systematic bits will eventually be transmitted on low-SNR layers, thereby experiencing lower protection and ultimately producing degraded LDPC decoding performance.

The above NR shortcoming may be addressed by a LDPC multilayer interleaver (MLI) of the first communication device 100 in which the disclosed solution is implemented. Such MLI may prioritize mapping of systematic bits to high-SNR layers. The MLI is a rectangular interleaver with $Q_m$ (=modulation order) rows and $E/Q_m$ columns. The bits in each column are mapped to a modulation symbol and then to a MIMO layer. The MLI forms subsets of the set of columns based on the SNRs of the corresponding layers, where two interleaver columns are in the same subset if their corresponding layer is the same, or if the corresponding layers have similar SNRs. With conventional multilayer-interleaved transmission, the gNB 100 selects the MCSs from the tables of the NR specification. However, usage of NR MCSs turns out to cause performance degradations, as explained in the next section.

Figure 7:
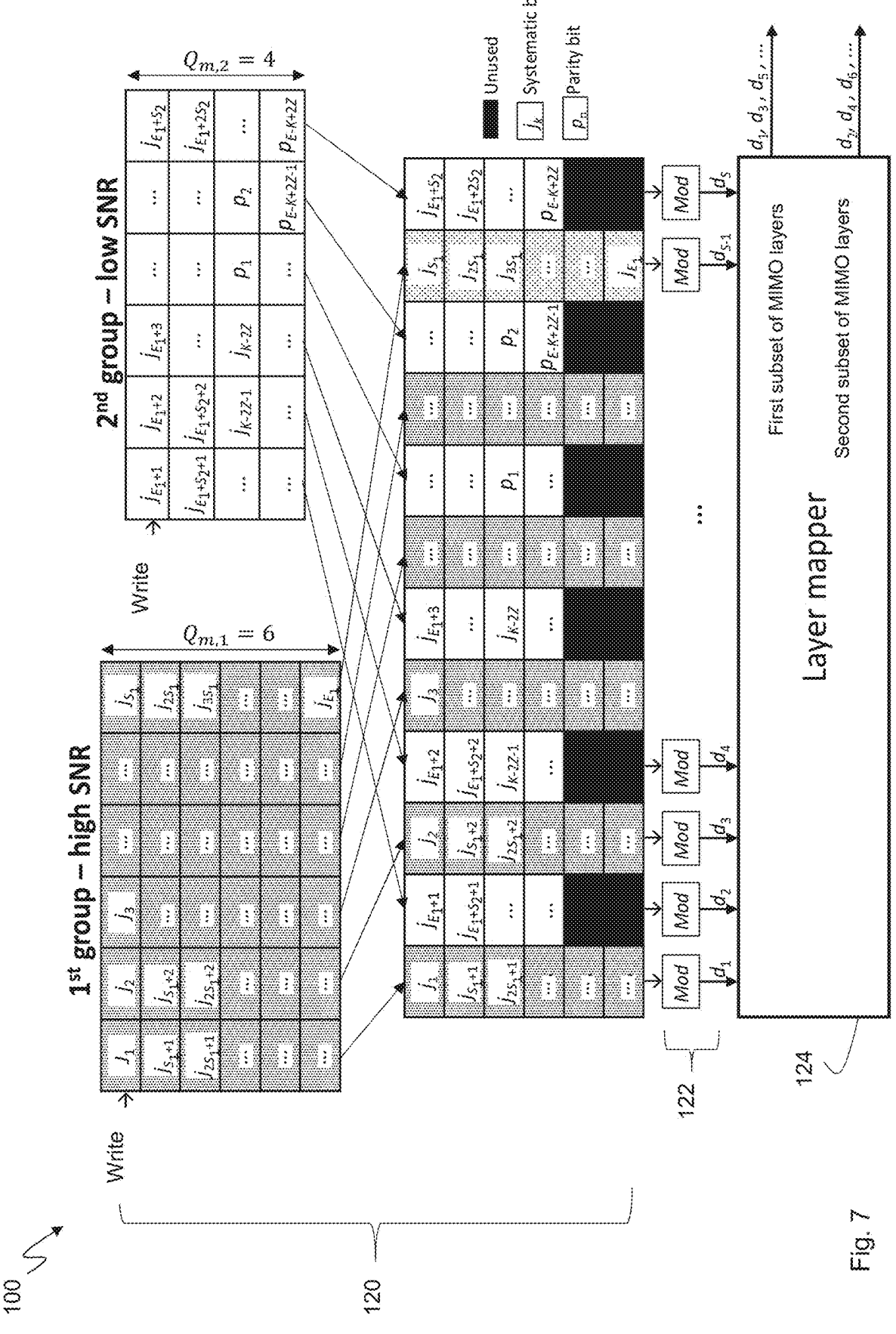
FIG. 7 illustrates a multilayer interleaver according to an embodiment.

FIG. 7 illustrates a MLI 120 with layer-subset specific modulation. In this particular example, the MLI has two column subsets and layer-subset specific modulation order, $Q_{m,1}=6$ for a $1^{st}$ subset of MIMO layers, $Q_{m,2}=4$ for a $2^{nd}$ subset of MIMO layers. The MLI 120 output is fed to the input of modulators 122 and the modulator outputs are fed to the input of a layer mapper block 124. Unlike conventional MLIs, it uses a high modulation order on the high-SNR layers and a low modulation order on the low-SNR layers. The high-order modulation is needed to fully harvest the capacity of high-SNR layers, as even the weakest modulation bits carry a non-negligible amount of information when the SNR is high. At the same time, the present MLI 120 uses low-order modulations on low-SNR layers, thereby not using weak modulation bits as they wouldn't carry any significant amount of information with low SNR.

Generally, a set of MIMO layers are mapped into two or more subsets of MIMO layers based on the modulation for each MIMO layer. When there are three or more MIMO layers to be mapped, it may sometimes be convenient to form more than two subsets of MIMO layers. The determination of the optimal number of subsets of MIMO layers and the content of each subset of MIMO layers may be obtained by determining the modulation for each MIMO layer and then mapping all the MIMO layers with same modulation to a same subset of MIMO layers. The subsets of MIMO layers may be merged so that the interleaver columns in a given subset of MIMO layers, which contains a given MIMO layer, are mapped to the positions in the merged interleaver matrix that will be transmitted in the given MIMO layer. As a benefit, the multilayer interleaver with layer-subset specific modulation may produce shorter codewords compared to the conventional interleavers, what results in a higher code rate. This mitigates a shortcoming of the conventional MLI in that usage of low code rates and high-order modulations at the same time is avoided.

Furthermore, in embodiments, the gNB 100 is configured to determine a modulation for each MIMO layer $M_l$ in the set of MIMO layers $M_1 \ldots M_L$ based on a set of channel qualities for the MIMO layer $M_l$ and a channel quality threshold value. For example, the set of channel qualities for the MIMO layer $M_l$ may be obtained based on the SNR of the MIMO layer and on a given modulation. Other channel quality measures may be used such as signal-to-interference plus noise ratio (SINR), received signal power, received signal strength, etc.

The set of channel qualities may be compared to a channel quality threshold value so as to determine whether all the channel qualities in the set of channel qualities are above the channel quality threshold value or not. The given modulation may be used for the MIMO layer $M_l$ when all the channel qualities in the set of channel qualities are above the channel quality threshold value.

When information bits are to be transmitted as in NR the channel quality and the channel quality threshold value corresponds to bit channel quality and bit channel quality threshold value, respectively. Therefore, in embodiments, the modulation selection is based on the more specific bit-channel capacity. For a given modulation of order $Q_m$, the modulation signals may be labeled by a $Q_m$-bit tuple. The bit channel capacity of the q-th bit (q=1, ..., $Q_m$) of the $Q_m$-bit tuple—denoted as $$\beta_q^{(Q_m)}(SNR) -$$

is the amount of information conveyed by that bit when a corresponding modulation symbol is transmitted on an Additive White Gaussian Noise channel of given Signal-to-Noise Ratio (SNR). The bit channel capacity $$\beta_q^{(Q_m)}(SNR)$$

may be defined as the mutual information between that given bit $b_q$ and the corresponding log-likelihood ratio (LLR) $\lambda_q$. In mathematical notation:

$$\beta_q^{(Q_m)}(SNR) = I(b_q, \lambda_q) \qquad (1)$$

where l(X, Y) denotes the mutual information between the random variables X and Y, and the log-likelihood ratio (LLR) $\lambda_q$ is defined as follows:

$$\lambda_q = \log \frac{P(b_q = 0 \mid y)}{P(b_q = 1 \mid y)} \qquad (2)$$

Here, y=x+w is the received modulation symbol and w is additive white Gaussian noise (AWGN) with variance $$\sigma_G^2.$$

Figure 8:
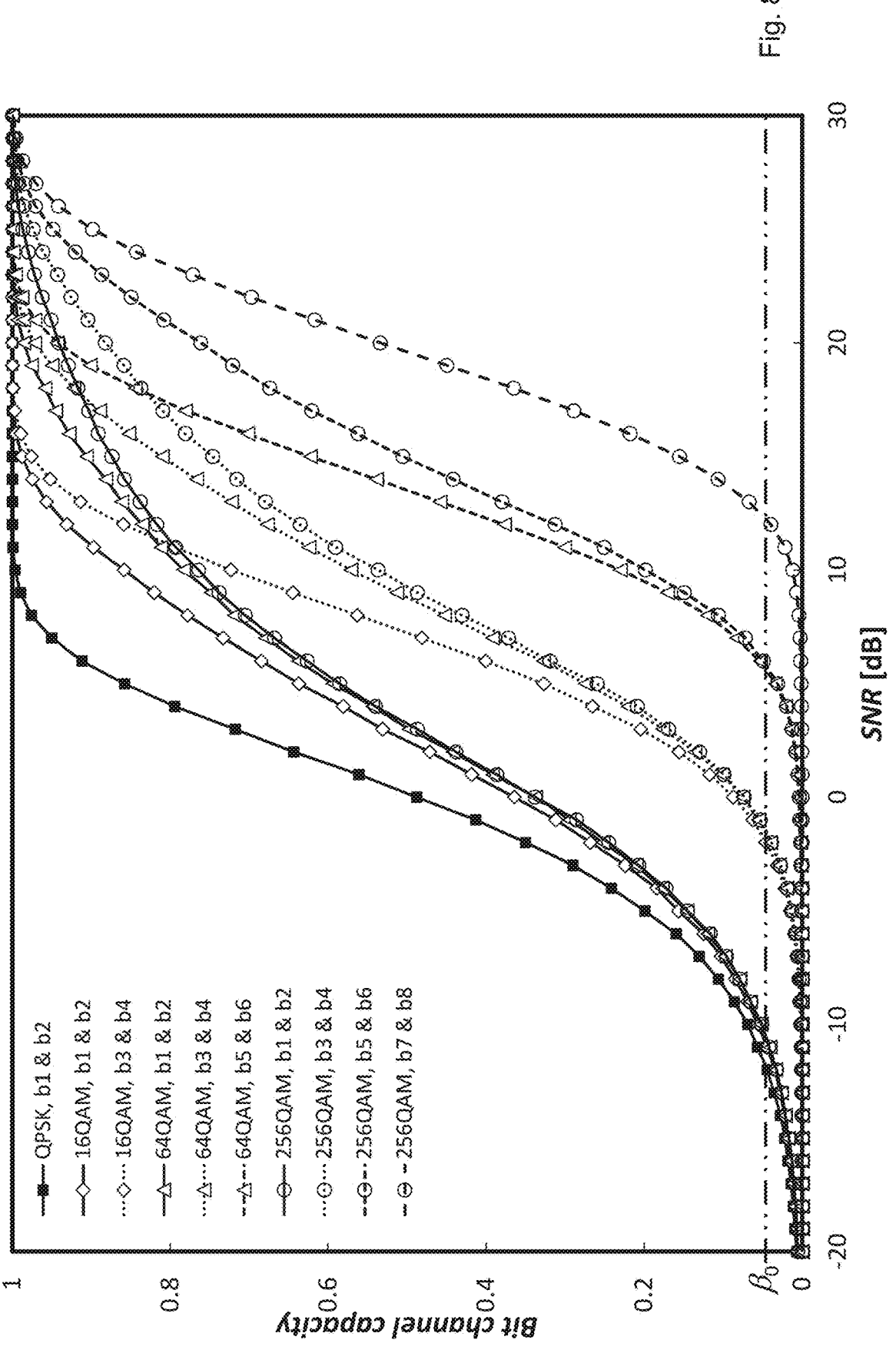
FIG. 8 shows bit channel capacity versus SNR.

The set of channel qualities for a given modulation may be determined based on the bit channel capacities. Bit channel capacities of Gray-labeled QPSK and $2^{Q_m}$-QAM modulations with $Q_m$=4, 6, 8 versus the SNR of a MIMO layer are shown in FIG. 8. A bit channel capacity threshold value $\beta_0$ is also shown in FIG. 8. The threshold value $\beta_0$ may have a value between 0 and 0.1, where any modulation bit having bit channel capacity less than the threshold value $\beta_0$ is assumed to convey a negligible amount of information. Thus, the modulations having at least one bit with capacity below $\beta_0$ are not suitable for the MIMO layer.

It is worth noting that the bit channels corresponding to the initial positions in the $Q_m$-tuple of any NR $2^{Q_m}$-QAM modulation have highest capacity. More precisely, for any SNR value, any QAM modulation order $Q_m$ and bit channel position $q_1, q_2 \in \{1, \ldots, Q_m\}$, $q_1 < q_2$, we have $$\beta_{q_1}^{(Q_m)}(SNR) \geq \beta_{q_2}^{(Q_m)}(SNR).$$

We can also write:

$$\beta_1^{(Q_m)}(SNR) = \beta_2^{(Q_m)}(SNR) > \beta_3^{(Q_m)}(SNR) = \beta_4^{(Q_m)}(SNR) > \ldots > \tag{3}$$
$$\beta_{Q_m-1}^{(Q_m)}(SNR) = \beta_{Q_m}^{(Q_m)}(SNR).$$

In other words, the $1^{st}$ and $2^{nd}$ bit of any NR QAM modulation have the same bit-channel capacity, which is larger than the bit-channel capacity of the other bits; the $3^{rd}$ and $4^{th}$ bit of any NR QAM modulation have the same bit-channel capacity, which is larger than the bit-channel capacity of the remaining bits, etc.

According to a possible modulation selection approach, for a given number of subsets of MIMO layers, the gNB 100 selects the highest-order modulation that has all bit-channel capacities above a given bit channel capacity threshold value $\beta_0$ on at least one layer in a subset of MIMO layers, i.e., there is at least one layer l in the subset of MIMO layers for which $$\beta_q^{(Q_m)}(SNR_l) \geq \beta_0 \text{ for all } q \in \{1, \ldots, Q_m\} \tag{4}$$

where $SNR_l$ is the SNR of the $l^{th}$ layer in the subset of MIMO layers. Thus, the gNB 100 may determine the modulation for the MIMO layer $M_l$ which comprises a set of channel qualities all exceeding the channel quality threshold value $\beta_0$ according to embodiments.

Moreover, the gNB 100 may also determine the code rate $R_C$ for the code word C so as to select a suitable MCS for the MIMO transmission. Hence, in embodiments, the gNB 100 is configured to determine the code rate $R_C$ for the code word C based on a code word length E and an information message length K for the set of MIMO layers $M_1, \ldots, M_L$. The information message length K may be determined based on a set of channel qualities $\beta 1, \ldots, \beta_Q$ for the set of MIMO layers $M_1, \ldots, M_L$. Thus, the codeword length E is determined by computing the number of bits that can be accommodated in a given transmission on all the resource elements (REs) according to embodiments, i.e.:

$$E = N_{RE} \sum_{l=1}^{L} Q_{m,l} \tag{5}$$

where $N_{RE}$ is the number of time-frequency resource elements, L is the number of MIMO layers and $Q_{m,l}$ is the modulation order of the $l^{th}$ MIMO layer.

The gNB 100 determines the information message length by summing the bit-channel capacities of all the modulation bits on all resource elements and all MIMO layers as follows:

$$K = \left\lfloor \sum_{r=1}^{N_{RE}} \sum_{l=1}^{L} \sum_{b=1}^{Q_{m,l}} \beta_b^{(Q_m)}(SNR_{r,l}) \right\rfloor \tag{6}$$

where L is the number of MIMO layers, $Q_{m,l}$ is the modulation order for the $l^{th}$ MIMO layer and $SNR_{r,l}$ is the SNR of the $l^{th}$ MIMO layer of the $r^{th}$ resource element. Note that the SNRs in (4) could be diminished by a pre-determined offset in order to take into account the gap between channel capacity and the true performance of the NR LDPC code at finite block-length.

The code rate may be obtained as follows:

$$R_C = \frac{K}{E}. \tag{7}$$

Note that both modulation selection based on (4) and code rate determination based on (6) can in embodiments be further based on an «adjusted» SNR value in order to take into account the codeword length and the real performance of LDPC codes, i.e.

$$SNR_{r,l} = SNR_{r,l}^{(real)} - \Delta_{SNR} \tag{8}$$

where $$SNR_{r,l}^{(real)}$$

is the true SNR that is actually experienced in the r-th resource element and in the l-th MIMO layer, and $\Delta_{SNR}$ can be determined by conventional link adaptation methods, e.g., outer loop link adaptation, etc.

In embodiments, the determined code rate $R_C$ is the highest code rate for the code word C meaning that transmission of a code word having higher code rate cannot be reliably accomplished.

The conventional mechanism for scheduling transmissions in NR is based on signaling a MCS in a DCI message, where the MCS jointly indicates a code rate $R_C$ and a modulation order $Q_m$. The conventional solution discloses control information formats for signaling MLI layer groups in a corresponding DCI bit field. With a layer-group specific modulations as herein disclosed, the UE 300 needs to further determine the modulation orders for each subset of MIMO layers. For this purpose, the following non-limiting approaches are presented and corresponding solutions herein disclosed.

In the selection of a MCS for a MIMO transmission, the gNB 100 may, in embodiments, select a MCS from a set of predefined MCSs which comprises a plurality of MCSs. The set of predefined MCSs may be defined and given by a communication standard, such as 3GPP NR.

Once the modulations $Q_{m,1}, \ldots Q_{m,L}$ have been selected, and the code rate $R_C$ has been determined, the gNB 100 may select a MCS from a set of predefined MCSs according to one of the following approaches without being limited thereto:

First approach:

Select a MCS from a set of predefined MCSs based on the code rate $R_C$, and

Adapt indication of the modulation in the control information 520.

Second approach:

Select a MCS from a set of predefined MCSs based on one of the modulations $Q_{m,1}, \ldots, Q_{m,G}$, and Adapt indication of code rate in the control information 520.

In the following disclosure proposed DCI formats according to the first and second approaches will be presented. The proposed DCI formats corresponds in these cases to the previously mentioned control information 520 transmitted from the first communication device 100 to the second communication device 300.

First Approach

According to a first example, the gNB 100 selects the MCS with highest code rate not exceeding the code rate $R_C$ in (7), regardless of the modulation that is indicated in the selected MCS. The gNB 100 forms a DCI containing the selected MCS, the layer-to-group mapping and the modulation of each group. The layer-to-group mapping is indicated by DCI bit fields $g_1, \ldots, g_L$, where each field has $[\log_2 G]$ bits and indicates the group that each layer belongs to. Hence, the DCI comprises a sequence of values $g_1, \ldots, g_L$, where a l-th value $g_l$ in the sequence of values indicates that a l-th MIMO layer is in a $g_l$-th subset of MIMO layers, where l is an integer.

The modulations are indicated by DCI bit fields $Q_{m,1}, \ldots, Q_{m,G}$, where each field has $[\log_2 \Omega]$ bits ($\Omega$ is the number of modulations) and indicates the modulation for the $g^{th}$ subset of MIMO layers, i.e., the control information 520 indicates a modulation of each subset of MIMO layers $S_1, \ldots, S_G$ among the two or more subsets of MIMO layers $S_1, \ldots, S_G$.

The number of DCI bits for signaling MCS (5 bits in NR), MLI groups and corresponding modulations is the following:

$$N_{DCI_1} = 5 + L[\log_2 G] + G[\log_2 \Omega] \text{ bits.} \qquad (9)$$

Figures 9, 10:
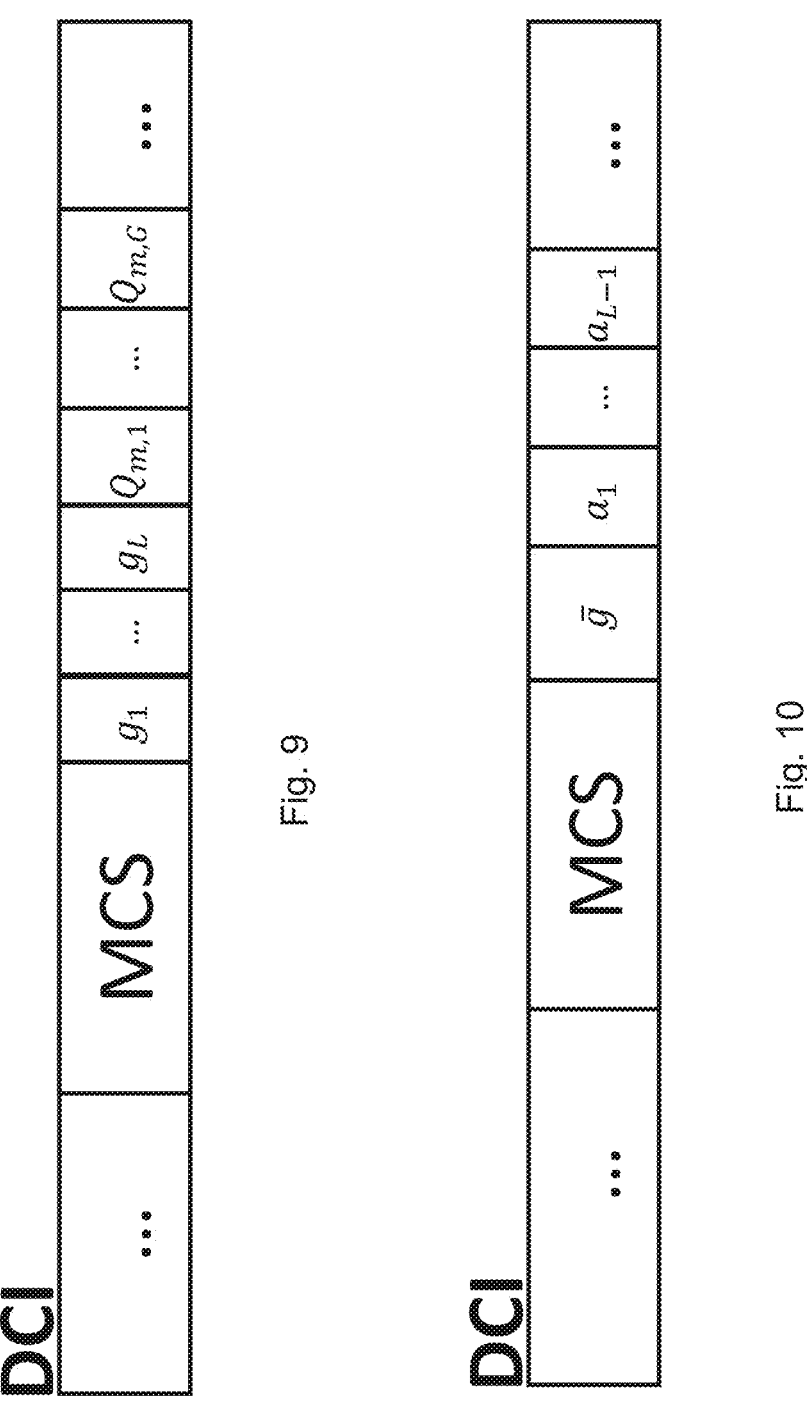
FIGS. 9 to 12 show proposed DCI formats according to embodiments.

FIG. 9 shows a DCI structure according to the first example with a sequence of values $g_1, \ldots, g_L$ where the l-th value $g_l$ indicates that the l-th MIMO layer in the $g_l$-th subset of MIMO layers, and a sequence of values $Q_{m,1}, \ldots, Q_{m,G}$ where the g-th value $Q_{m,g}$ indicates the modulation for the g-th subset of MIMO layers.

According to a second example, the gNB 100 selects the MCS with highest code rate not exceeding $R_C$ (7), regardless of the modulation that is indicated in that MCS. In other words, the selected MCS in the set of predefined MCSs has a code rate being closest to the code rate $R_C$ for the code word C but not exceeding the code rate $R_C$ for the code word C.

The modulation order $Q_m$ that is indicated in the selected MCS is used on a given subset of MIMO layers $\bar{g}$ ($1 \le g \le G$) which is signaled to the UE 300 in a corresponding bit field in the DCI that schedules the transmission—see FIG. 10.

Thus, the control information 520 further indicates a subset of MIMO layers $S_g$ among the two or more subsets of MIMO layers $S_1, \ldots, S_G$.

For the remaining additional bits $a_l$, l=1, ..., L−1, it is assumed that the gNB 100 and the UE 300 are able to arrange the set of MIMO layers in the same order according to decreasing SNRs (i.e., $SNR_1 \ge SNR_2 \ge \ldots \ge SNR_L$), and $a_l$ indicates whether the l-th MIMO layer is in the same subset of MIMO layers as the (l−1)-th MIMO layer (e.g., when $a_l$=0), or whether it is in another subset of MIMO layers with lower modulation order $Q_{m,l} = Q_{m,l-2}-2$, e.g., when $a_l$=1. In other words, the result of the mapping of the set of MIMO layers $M_1, \ldots, M_L$ into the two or more subsets of MIMO layers $S_1, \ldots, S_G$ is indicated by a sequence of bits $a_1, \ldots, a_{L-1}$, where a l-th bit $a_l$ in the sequence of bits indicates that a l-th MIMO layer and a (l+1)-th MIMO layer are in the same subset of MIMO layers, where l is an integer.

The number of DCI bits for signaling MCS (5 bits in NR), MLI groups and corresponding modulations is the following:

$$N_{DCI_2} = N_{MCS} + [\log_2 G] + L - 1 \text{ bits.} \qquad (10)$$

Compared to (9), there is a significant saving in DCI bits. For example, when L=4, G=3, $\Omega$=4, the second example compared to the first example uses 9 bits fewer than the first example.

FIG. 10 shows DCI structure according to the second example, where $\bar{g}$ indicates a subset of MIMO layers where the modulation order $Q_m$ that is indicated in the selected MCS is used, and a sequence of bits $a_1, \ldots, a_{L-1}$, where a l-th bit $a_1$ in the sequence of bits indicates that a l-th MIMO layer and a (l+1)-th MIMO layer are in the same subset of MIMO layers, where l is an integer.

According to a third example, the gNB 100 selects the MCS with highest code rate not exceeding $R_C$ (7), regardless of the modulation that is indicated in that MCS. The gNB 100 indicates to the UE 300 the modulation $Q_{m,1}$ to be used in the first subset of MIMO layers in a suitable DCI bit field. The bits of the modulation map—bits $b_0$, $b_1$, ..., $b_{[log_2 \Omega]-1}$—indicate the modulation used on the first subset of MIMO layers, e.g., according to Table 1, where a modulation order uniquely identifies a modulation scheme.

TABLE 1

| Modulation indication. | | |
| --- | --- | --- |
| Modulation scheme | Modulation order $Q_m$ | Information bits $b_0$, $b_1$ |
| QPSK | 2 | 0, 0 |
| 16QAM | 4 | 0, 1 |
| 64QAM | 6 | 1, 0 |
| 256QAM | 8 | 1, 1 |

The remaining bits $a_l$, l=1, ..., L−1, indicate whether the l-th MIMO layer is in the same subset of MIMO layers as the (l+1)-th layer (e.g., when $a_l$=0), or whether it is in another subset of MIMO layers with lower modulation order $Q_{m,l} = Q_{m,l-1}-2$ (e.g., when $a_l$=1). The number of DCI bits for signaling MCS (5 bits in NR), subsets of MIMO layers and corresponding modulations is the following:

$$N_{DCI_3} = N_{MCS} + \lceil \log_2 \Omega \rceil + L - 1 \text{ bits.} \qquad (11)$$

Compared to (9), there is a significant saving in DCI bits. For example, when L=4, G=3, $\Omega$=4, the second example compared to first example has 9 bits fewer.

Figures 11, 12:
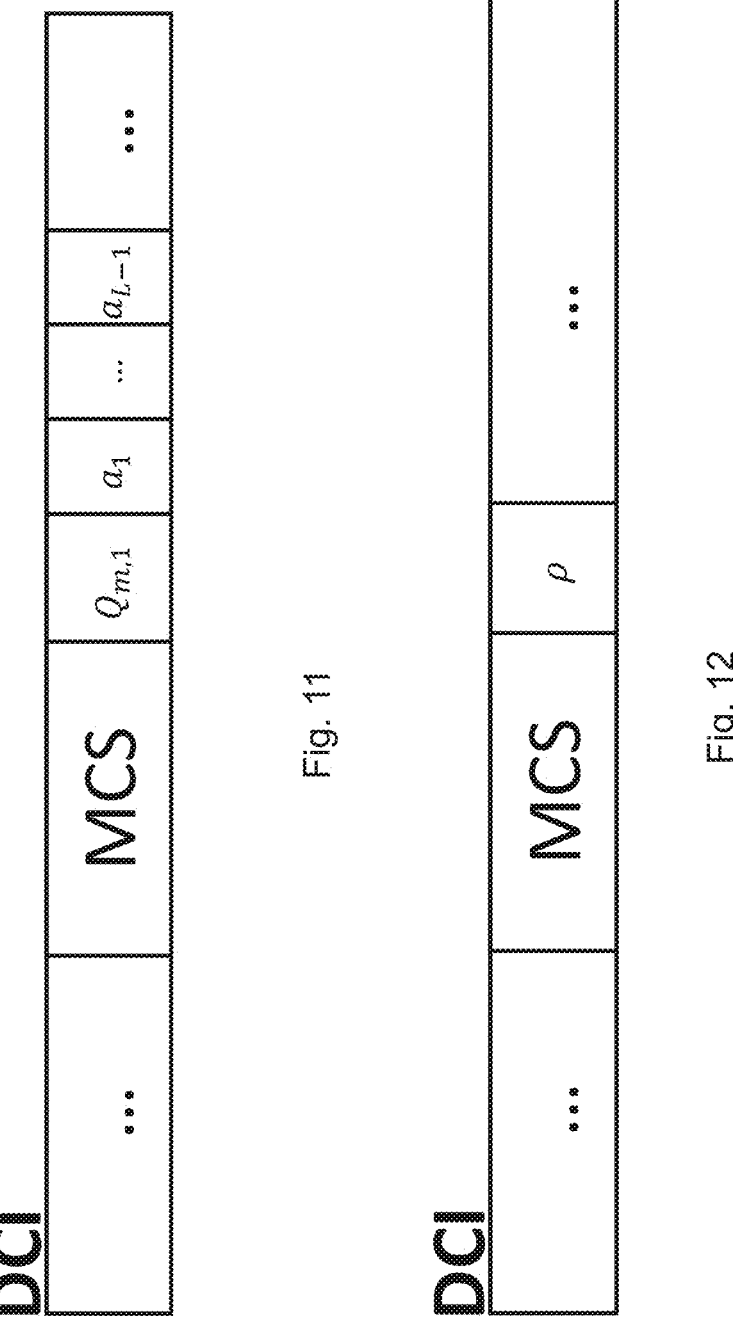

FIG. 11 shows DCI structure according to the third example where $Q_{m,1}$ indicates a modulation for the first subset of MIMO layers, and a sequence of bits $a_1, \ldots, a_{L-1}$, where a l-th bit $a_l$ in the sequence of bits indicates that a l-th MIMO layer and a (l+1)-th MIMO layer are in the same subset of MIMO layers, where l is an integer.

Second Approach

In embodiments, the selected MCS has a modulation equal to a modulation of a subset of MIMO layers $S_g$ having a highest modulation order or a lowest modulation order among the two or more subsets of MIMO layers.

According to a fourth example, the gNB 100 selects the MCS with the modulation of the subset of MIMO layers among the two or more MIMO layers having the highest SNR, i.e., $Q_{m,1}=Q_m$. The gNB 100 and the UE 300 further assume that the second subset of MIMO layers uses the highest modulation order among those with modulation order $<Q_{m,1}$, i.e., $Q_{m,2}=Q_{m,1}-2$; the third subset of MIMO layers uses the highest modulation order among those with modulation order $<Q_{m,2}$, i.e., $Q_{m,3}=Q_{m,2}-2$, etc. The code rate in the fourth example may be determined based on the MCS and an additional DCI bit p that indicates a predefined scaling factor for the code rate. Thus, in such cases, the control information 520 further indicates a code rate scaling factor for a selected MCS from a set of predefined MCSs. For example: when p=0, the code rate used for the transmission is the rate indicated in the MCS; and when p=1, the code rate used for the transmission is the rate indicated in the MCS multiplied by a predefined scaling factor $\sigma<1$ (e.g., $\sigma$=0.5).

The number of DCI bits for signaling is given by the following formula:

$$N_{DCI_4} = N_{MCS} + 1 \text{ bits.} \qquad (11)$$

Compared to (8), there is a significant saving in DCI bits. For example, when L=4, G=3, $\Omega$=4, the second example compared to first example has 9 bits fewer.

FIG. 12 shows a DCI structure according to the fourth example where the value $\rho$ indicates a predefined code rate scaling factor for the code rate indicated by the MCS.

According to a fifth example, the gNB 100 selects the MCS with the modulation used in the subset of MIMO layers among the two or more MIMO layers having the highest SNR, i.e., $Q_{m,G}=Q_m$. The gNB 100 and the UE 300 further assume that the $(G-1)^{th}$ MIMO layer subset uses the lowest modulation order among those with modulation order $>Q_{m,G}$, i.e., $Q_{m,G-1}=Q_{m,G}+2$; the $(G-2)^{th}$ subset of MIMO layers uses the lowest modulation order among those with modulation order $>Q_{m,G-1}$, i.e., $Q_{m,G-2}=Q_{m,G-1}+2$, etc. The code rate may be determined in the same way as in the fourth example. The number of DCI bits for signaling is the same as for the fourth example.

Further Indications

According to a sixth example, the MCS is selected according to any of the two methods described above, and the DCI that schedules the downlink transmission contains up to L additional bit fields for layer indication, i.e., $(LI_1, \ldots, LI_\Lambda)$ where $\Lambda \leq L$ and where $LI_1$ iindicates the strongest layer, $LI_2$ indicates the second strongest layer, etc. Each of the bit fields $LI_l$ has $\lceil \log_2 L \rceil$ bits.

According to a seventh example, the MCS is selected according to any of the two methods described above, and it is assumed that there are only two subsets of MIMO layers, i.e., a first subset of MIMO layers having a high SNR and a second subset of MIMO layers having a low SNR, where the first subset of MIMO layer comprises all MIMO layers with SNRs above a given SNR threshold value, and the second subset of MIMO layers comprises all other MIMO layers. Thus, the DCI that schedules the MIMO transmission contains an additional bit field $[p_1, \ldots, p_L]$, where each bit indicates whether the corresponding MIMO layer has high SNR, e.g., $p_l$=1, or low SNR, e.g., $p_l$=0.

Performance evaluations of embodiments have been carried out by Monte Carlo simulation according to the simulation parameters given in Table 2. The network deployment consists of a base station which covers a 120° sector of given radius and a number of UEs which are dropped at random locations within the sector. Each UE travels along a linear trajectory with random direction at constant speed. Performances are averaged over the set of dropped UEs.

TABLE 2

| Simulation parameters. | | |
|---|---|---|
| Parameter | Value | Units |
| Carrier frequency | 3.5 | GigaHertz |
| UE speed | 3 | meters/second |
| Delay spread | 100 | nanoseconds |
| Subcarrier spacing | 30 | kiloHertz |
| Slot duration | 0.5 | milliseconds |
| Number of slots | 1000, 10000 | |
| Number of UEs | 10 | |
| BS antenna panel | 8 × 8 | antenna elements |
| UE antenna panel | 2 × 2 | antenna elements |
| Time-domain allocation | 1 | OFDM symbols/slot |
| Frequency allocation | 5, 20 | resource blocks |
| Fading model | 3GPP CDL-C | |
| BS height | 15 | meters |
| Target Block Error Rate | $10^{-1}$, $10^{-3}$ | |
| $\beta_0$ | 0.01 | |

The performance has been evaluated as throughput, measured in bits per resource element.

Table 3 shows the performances obtained with target BLER=$10^{-1}$ and short block length—frequency domain resource allocation is 5 RBs. Table 4 shows the performances obtained with target BLER=$10^{-1}$ and long block length—frequency domain resource allocation is 20 RBs. In both Table 3 and 4, it can be observed that the MLI with layer-group specific modulations (labeled MLI/LSM) performs better that the other conventional schemes. In particular, the gain compared to NR is between 9.9% and 21.8%, whereas the gain compared to a conventional solution (denoted Layer-Specific Modulation (LSM)) is between 1.9% and 6.7%.

TABLE 3

Throughput [bits per resource element] of MLI with NR MCSs (MLI/MCS) and MLI with LSM (MLI/LSM) compared to conventional NR, dual codeword (2CW), layer-specific modulation according to conventional solution (LSM). Target BLER is $10^{-1}$. Frequency allocation: 5 resource blocks.

| SNR [dB] | NR | 2CW | LSM | MLI + MCS | MLI + LSM | Gain of MLI + LSM over NR | Gain of MLI + LSM over LSM |
|---|---|---|---|---|---|---|---|
| 0 | 1.51 | 1.49 | 1.59 | 1.52 | 1.66 | 9.9% | 4.4% |
| 10 | 5.22 | 5.44 | 5.66 | 5.55 | 6.04 | 15.7% | 6.7% |
| 20 | 11.46 | 12.81 | 13.40 | 12.10 | 13.65 | 19.1% | 1.9% |

TABLE 4

Throughput [bits per resource element] of MLI with NR MCSs (MLI/MCS) and MLI with LSM (MLI/LSM) compared to conventional NR, dual codeword (2CW), layer-specific modulation according to conventional solution (LSM). Target BLER is $10^{-1}$. Frequency allocation: 20 resource blocks.

| SNR [dB] | NR | 2CW | LSM | MLI/MCS | MLI + LSM | Gain of MLI + LSM over NR | Gain of MLI + LSM over LSM |
|---|---|---|---|---|---|---|---|
| 0 | 1.54 | 1.66 | 1.71 | 1.55 | 1.79 | 16.2% | 4.7% |
| 10 | 5.19 | 5.62 | 5.77 | 5.54 | 6.12 | 17.9% | 6.1% |
| 20 | 11.21 | 12.82 | 13.39 | 11.86 | 13.65 | 21.8% | 1.9% |

Table 5 show the performances obtained with target BLER=$10^{-3}$ and short block length—frequency domain resource allocation is 5 RBs. Table 6 shows the performances obtained with target BLER=$10^{-3}$ and long block length—frequency domain resource allocation is 20 RBs. In both tables, it can be observed that the MLI with layer-group specific modulations (labeled MLI/LSM) performs better that the other conventional schemes. In particular, the gain compared to NR is between 13.5% and 34.6%, whereas the gain compared to a conventional solution (denoted LSM) is between 0.0% and 29.4%.

TABLE 5

Throughput [bits per resource element] of MLI with NR MCSs (MLI/MCS) and MLI with LSM (MLI/LSM) compared to conventional NR, dual codeword (2CW), layer-specific modulation in a conventional solution (LSM). Target BLER is $10^{-3}$. Frequency allocation: 5 resource blocks.

| SNR [dB] | NR | 2CW | LSM | MLI/MCS | MLI + LSM | Gain of MLI + LSM over NR | Gain of MLI + LSM over LSM |
|---|---|---|---|---|---|---|---|
| 0 | 1.11 | 1.09 | 1.25 | 1.11 | 1.26 | 13.5% | 0.8% |
| 10 | 4.30 | 4.33 | 4.46 | 5.08 | 5.77 | 34.2% | 29.4% |
| 20 | 9.74 | 10.90 | 12.12 | 12.16 | 12.79 | 31.3% | 5.6% |

TABLE 6

Throughput [bits per resource element] of MLI with NR MCSs (MLI/MCS) and MLI with LSM (MLI/LSM) compared to conventional NR, dual codeword (2CW), layer-specific modulation in a conventional solution (LSM). Target BLER is $10^{-3}$. Frequency allocation: 20 resource blocks.

| SNR [dB] | NR | 2CW | LSM | MLI/MCS | MLI + LSM | Gain of MLI + LSM over NR | Gain of MLI + LSM over LSM |
|---|---|---|---|---|---|---|---|
| 0 | 1.22 | 1.23 | 1.50 | 1.22 | 1.50 | 23.0% | 0.0% |
| 10 | 4.96 | 5.22 | 5.36 | 5.57 | 6.28 | 26.6% | 17.2% |
| 20 | 10.01 | 11.27 | 11.72 | 12.36 | 13.47 | 34.6% | 15.4% |

A network access node herein may also be denoted as a radio network access node, an access network access node, an access point (AP), or a base station (BS), e.g., a radio base station (RBS), which in some networks may be referred to as transmitter, "gNB", "gNodeB", "eNB", "eNodeB", "NodeB" or "B node", depending on the standard, technology and terminology used. The radio network access nodes may be of different classes or types such as e.g., macro eNodeB, home eNodeB or pico base station, based on transmission power and thereby the cell size. The radio network access node may further be a station (STA), which is any device that contains an IEEE 802.11-conformant media access control (MAC) and physical layer (PHY) interface to the wireless medium (WM). The radio network access node may be configured for communication in 3GPP related long term evolution (LTE), LTE-advanced, fifth generation (5G) wireless systems, such as new radio (NR) and their evolutions, as well as in IEEE related Wi-Fi, worldwide interoperability for microwave access (WiMAX) and their evolutions.

A client device herein may be denoted as a user device, a user equipment (UE), a mobile station, an internet of things (IoT) device, a sensor device, a wireless terminal and/or a mobile terminal, and is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via a radio access network (RAN), with another communication entity, such as another receiver or a server. The UE may further be a station (STA), which is any device that contains an IEEE 802.11-conformant media access control (MAC) and physical layer (PHY) interface to the wireless medium (WM). The UE may be configured for communication in 3GPP related long term evolution (LTE), LTE-advanced, fifth generation (5G) wireless systems, such as new radio (NR), and their evolutions, as well as in IEEE related Wi-Fi, worldwide interoperability for microwave access (WiMAX) and their evolutions.

Furthermore, any method according to embodiments may be implemented in a computer program, having code means, which when run by processing means causes the processing means to execute the steps of the method. The computer program is included in a computer readable medium of a computer program product. The computer readable medium may comprise essentially any memory, such as previously mentioned a read-only memory (ROM), a programmable read-only memory (PROM), an erasable PROM (EPROM), a flash memory, an electrically erasable PROM (EEPROM), or a hard disk drive.

Moreover, it should be realized that the network access node and the client device comprise the necessary communication capabilities in the form of e.g., functions, means, units, elements, etc., for performing or implementing embodiments. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Therefore, the processor(s) of the network access node and the client device may comprise, e.g., one or more instances of a central processing unit (CPU), a processing unit, a processing circuit, a processor, an application specific integrated circuit (ASIC), a microprocessor, or other processing logic that may interpret and execute instructions. The expression "processor" may thus represent a processing circuitry comprising a plurality of processing circuits, such as e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended claims.

What is claimed is:

1. A first communication device for a communication system, the first communication device being configured to:
map a set of multiple-input-multiple-output (MIMO) layers ($M_1, \ldots, M_L$) into two or more subsets of MIMO layers ($S_1, \ldots, S_G$) based on a modulation for each respective MIMO layer ($M_l$) in the set of MIMO layers ($M_1, \ldots, M_L$), wherein MIMO layers in a respective subset of MIMO layers have a same modulation;
select a modulation and coding scheme (MCS) for the set of MIMO layers ($M_1, \ldots, M_L$) based on a code rate $R_C$ for a code word C and/or a modulation for a subset of MIMO layers ($S_g$) among the two or more subsets of MIMO layers ($S_1, \ldots, S_G$);
transmit the code word C on the set of MIMO layers ($M_1, \ldots, M_L$) in a MIMO transmission to a second communication device based on the selected MCS; and
transmit control information to the second communication device, the control information indicating the selected MCS and a result of the mapping of the set of MIMO layers ($M_1, \ldots, M_L$) into the two or more subsets of MIMO layers ($S_1, \ldots, S_G$).

2. The first communication device according to claim 1, wherein the first communication device is configured to determine, for each respective MIMO layer ($M_l$) in the set of MIMO layers ($M_1 \ldots M_L$), a modulation based on a channel quality for the respective MIMO layer ($M_l$) and a channel quality threshold value.

3. The first communication device according to claim 2, wherein the determined modulation for the MIMO layer ($M_l$) comprises a set of channel qualities all exceeding the channel quality threshold value.

4. The first communication device according to claim 1, wherein the first communication device is configured to determine the code rate $R_C$ for the code word C based on a code word length E and an information message length K for the set of MIMO layers ($M_1, \ldots, M_L$), wherein the information message length K is determined based on a set of channel qualities ($\beta_1, \ldots, \beta_Q$) for the set of MIMO layers ($M_1, \ldots, M_L$).

5. The first communication device according to claim 4, wherein the determined code rate $R_C$ is a highest code rate for the code word C.

6. The first communication device according to claim 1, wherein the result of the mapping of the set of MIMO layers ($M_1, \ldots, M_L$) into the two or more subsets of MIMO layers ($S_1, \ldots, S_G$) is indicated by:
a sequence of values ($g_1, \ldots, g_L$), where an l-th value ($g_l$) in the sequence of values indicates that an l-th MIMO layer is in a ($g_l$)-th subset of MIMO layers, where l is an integer; or
a sequence of bits ($p_1, \ldots, p_L$), where an l-th bit ($p_l$) in the sequence of bits indicates that an l-th MIMO layer is in a first subset of MIMO layers or in a second subset of MIMO layers, where l is an integer; or
a sequence of bits ($\alpha_1, \ldots, a_{L-1}$), where a k-th bit ($a_k$) in the sequence of bits indicates that a k-th MIMO layer and a (k+1)-th MIMO layer are in a same subset of MIMO layers, where k is an integer.

7. The first communication device according to claim 1, wherein the first communication device is configured to select the MCS from a set of predefined MCSs.

8. The first communication device according to claim 7, wherein the selected MCS in the set of predefined MCSs has a code rate being closest to the code rate $R_C$ for the code word C but not exceeding the code rate $R_C$ for the code word C.

9. The first communication device according to claim 8, wherein the control information further indicates:
a modulation of each subset of MIMO layers ($S_1, \ldots, S_G$) among the two or more subsets of MIMO layers ($S_1, \ldots, S_G$); or
a subset of MIMO layers ($S_g$) among the two or more subsets of MIMO layers ($S_1, \ldots, S_G$); or
a modulation for a subset of MIMO layers ($S_g$) having a highest or a lowest channel quality among the two or more subsets of MIMO layers ($S_1, \ldots, S_G$).

10. The first communication device (100) according to claim 8, wherein the control information (520) further indicates a subset of MIMO layers ($S_g$) among the two or more subsets of MIMO layers ($S_1, \ldots, S_G$).

11. The first communication device according to claim 7, wherein the selected MCS has a modulation equal to a modulation of a subset of MIMO layers ($S_g$) having a highest modulation order or a lowest modulation order.

12. A second communication device for a communication system, the second communication device being configured to:
receive a code word C on a set of multiple-input-multiple-output (MIMO) layers ($M_1, \ldots, M_L$) in a MIMO transmission from a first communication device based on a modulation and coding scheme (MCS), the set of MIMO layers ($M_1, \ldots, M_L$) being mapped into two or more subsets of MIMO layers ($S_1, \ldots, S_G$) based on a modulation for each respective MIMO layer ($M_l$) in the set of MIMO layers ($M_1, \ldots, M_L$), wherein MIMO layers in a same subset of MIMO layers have a same modulation;

receive control information from the first communication device, the control information indicating the MCS and a result of the mapping of the set of MIMO layers $(M_1, \ldots, M_L)$ into the two or more subsets of MIMO layers $(S_1, \ldots, S_G)$; and demodulate and decode the MIMO transmission based on the control information to determine the code word C.

13. The second communication device according to claim 12, wherein demodulating and decoding the MIMO transmission comprises determining a modulation for each respective MIMO layer $(M_l)$ in the set of MIMO layers $(M_1, \ldots, M_L)$, a code word length E, and an information message length K for the code word C based on the control information.

14. The second communication device according to claim 12, wherein the control information indicates the result of the mapping of the set of MIMO layers $(M_1, \ldots, M_L)$ into the two or more subsets of MIMO layers $(S_1, \ldots, S_G)$ by:

a sequence of values $(g_1, \ldots, g_L)$, where an l-th value $(g_l)$ in the sequence of values indicates that an l-th MIMO layer is in a $(g_l)$-th subset of MIMO layers, where l is an integer; or a sequence of bits $(p_1, \ldots, p_L)$, where an l-th bit $(p_l)$ in the sequence of bits indicates that an l-th MIMO layer is in a first subset of MIMO layers or in a second subset of MIMO layers, where l is an integer; or a sequence of bits $(a_1, \ldots, a_{L-1})$, where a k-th bit $(a_k)$ in the sequence of bits indicates that a k-th MIMO layer and a (k+1)-th MIMO layer are in a same subset of MIMO layers, where k is an integer.

15. The second communication device according to claim 12, wherein the control information further indicates:

a modulation of each subset of MIMO layers $(S_1, \ldots, S_G)$ among the two or more subsets of MIMO layers $(S_1, \ldots, S_G)$; or a subset of MIMO layers $(S_g)$ among the two or more subsets of MIMO layers $(S_1, \ldots, S_G)$; or a modulation for a subset of MIMO layers $(S_g)$ having a highest or a lowest channel quality among the two or more subset of MIMO layers $(S_1, \ldots, S_G)$.

16. The second communication device according to claim 12, wherein the indicated MCS has a modulation equal to a modulation of a subset of MIMO layers $(S_g)$ having a highest modulation order or a lowest modulation order.

17. The second communication device according to claim 12, wherein the control information further indicates a code rate scaling factor for the indicated MCS.

18. The second communication device according to claim 12, wherein the code word C is a low-density parity check code word.

19. A method for a second communication device, the method comprising:

receiving a code word C on a set of multiple-input-multiple-output (MIMO) layers $(M_1, \ldots, M_L)$ in a MIMO transmission from a first communication device based on a modulation and coding scheme (MCS) the set of MIMO layers $(M_1, \ldots, M_L)$ being mapped into two or more subsets of MIMO layers $(S_1, \ldots, S_G)$ based on a modulation for each respective MIMO layer $(M_l)$ in the set of MIMO layers $(M_1, \ldots, M_L)$, wherein MIMO layers in a same subset of MIMO layers have a same modulation;

receiving control information from the first communication device, the control information indicating the MCS and a result of the mapping of the set of MIMO layers $(M_1, \ldots, M_L)$ into the two or more subsets of MIMO layers $(S_1, \ldots, S_G)$; and demodulating and decoding the MIMO transmission based on the control information to determine the code word C.

20. Non-transitory computer readable media having stored thereon processor executable instructions that, when executed by processing circuitry, cause the processing circuitry to perform the method according to claim 19.

*   *   *   *   *